United States Patent
Laskowski et al.

(10) Patent No.: US 11,231,135 B2
(45) Date of Patent: Jan. 25, 2022

(54) SELF-RETAINING PLUG AND COMPATIBLE SOCKET

(71) Applicant: GM Global Technology Operations LLC, Detroit, MI (US)

(72) Inventors: Trevor Laskowski, Warren, MI (US); Terry Short, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 16/385,753

(22) Filed: Apr. 16, 2019

(65) Prior Publication Data
US 2020/0332936 A1    Oct. 22, 2020

(51) Int. Cl.
| F16L 5/02 | (2006.01) |
| F16L 33/30 | (2006.01) |
| F16L 33/18 | (2006.01) |
| F16L 55/11 | (2006.01) |
| G01N 1/22 | (2006.01) |
| F16L 37/252 | (2006.01) |

(52) U.S. Cl.
CPC ............... *F16L 33/30* (2013.01); *F16L 33/18* (2013.01); *F16L 5/02* (2013.01); *F16L 37/252* (2013.01); *F16L 55/11* (2013.01); *F16L 55/1125* (2013.01); *G01N 1/22* (2013.01)

(58) Field of Classification Search
CPC . F16L 33/30; F16L 33/18; F16L 47/28; F16L 55/11; F16L 55/1125; F16L 37/252; F16L 37/244; F16L 37/24; F16L 55/1141; F16L 37/60; F16L 5/02; F16L 5/027; G01N 1/22; F01M 2011/0416

USPC ............... 285/141.1, 93, 192; 138/90
See application file for complete search history.

(56) References Cited

U.S. PATENT DOCUMENTS

| 1,909,058 A | * | 5/1933 | Horbach | F16L 37/252 |
| 3,650,551 A | * | 3/1972 | Akers | F16L 37/252 |
| 5,542,761 A | * | 8/1996 | Dedoes | |
| 7,240,700 B2 | * | 7/2007 | Pangallo | |
| 2007/0284880 A1 | * | 12/2007 | Zirin | F16L 37/252 |

FOREIGN PATENT DOCUMENTS

| DE | 102010026429 A1 | * | 1/2012 | |
| DE | 102018114918 A1 | * | 12/2019 | F16L 37/252 |
| EP | 2990621 B1 | * | 2/2018 | F16L 55/1125 |

* cited by examiner

*Primary Examiner* — Matthew Troutman
*Assistant Examiner* — William S. Choi
(74) *Attorney, Agent, or Firm* — Quinn IP Law

(57) ABSTRACT

A plug having a longitudinal axis includes a plug body having a generally flat sealing surface on an axial end thereof, and a protuberance extending from the axial end generally concentric with the longitudinal axis. The protuberance has a first section contiguous with the plug body, and a second section having a hub portion contiguous with the first section and a plurality of generally evenly spaced arms extending outward from the hub portion. An underside surface of each arm faces the sealing surface of the plug body and has a generally flat portion and a ramped nub thereon projecting toward the sealing surface. The plug may be inserted into a compatible socket having tabs and rotated about the longitudinal axis for sealable engagement with the socket.

20 Claims, 8 Drawing Sheets

SELF-RETAINING PLUG AND COMPATIBLE SOCKET

INTRODUCTION

This disclosure generally relates to self-retaining mechanical plugs and compatible sockets.

In manufacturing and assembly environments such as in the automotive industry, a structural assembly such as an automotive cockpit or passenger compartment may include an enclosed compartment made of thin-walled material such as sheet metal or the like. A wall of this compartment may have a hole formed therethrough, which may be used for ventilation, drainage, inspection, tool access or other purposes. In some cases, such a hole may need to be covered up for some time by a plate or cover, and then uncovered at other times. One approach for this is to provide bolts or threaded studs adjacent the hole, either attached on the exterior surface of the wall or fed through from the interior side of the wall. A plate having small holes corresponding to the placement of the bolts or studs may then be placed over the hole in the wall such that the bolts or studs protrude through the small holes, and nuts may be spun onto the bolts or studs, thereby removably fastening the plate against the hole. The plate may optionally have a sampling/monitoring port therethrough, with one end of a hose sealably connected to the port and the other end of the hose sealably connected to a device used for sampling or monitoring the atmosphere or other conditions on the other side of the plate.

This approach involves the use of multiple pieces of hardware, such as bolts or studs, nuts and a plate or cover. Plus, it involves either welding or affixing two or more threaded studs onto the exterior side of the compartment wall where the plate is to be placed, or drilling two or more small holes through the wall and passing bolts through the small holes from the interior side of the compartment and fixing the bolts in place (such as by using low-profile stop nuts).

Furthermore, in automated manufacturing and assembly environments, measures may be put in place to assure that processes have been adequately performed. For example, after certain fasteners and plugs have been installed into an assembly, manual or automated checks may be made to assure that the fasteners and plugs have been installed using the proper torque. A torque gun or torque wrench may be used to apply clockwise and/or counterclockwise torque to the fasteners and plugs, to test whether they do or do not turn using a minimum and/or maximum torque, as the particular case may be.

In some automated environments, testing equipment such as torque guns and torque wrenches may include sensors and other apparatus that generate a signal indicating the amount of torque applied, the amount of torque resistance encountered from the fastener or plug, the magnitude and rotational speed of the fastener or plug turning, and so forth. If a fastener or plug is tested as described above and the fastener or plug fails to meet the expected torque requirements, a signal may trigger an alarm to indicate the need for attention to the failure, and in some cases the signal may also trigger a shut-down of the automated assembly line.

Additionally, once a fastener or plug is installed, it may be difficult to determine by manual testing whether the fastener or plug is adequately installed to the desired torque.

SUMMARY

According to one embodiment, a plug has a longitudinal axis defining forward and rearward axial directions, inward and outward radial directions, and clockwise and counter-clockwise circumferential directions as viewed in the forward direction. The plug includes a plug body having opposed forward and rearward ends wherein the forward end has a generally flat sealing surface facing in the forward direction, and a protuberance extending from the forward end of the plug body generally concentric with the longitudinal axis. The protuberance has a first section contiguous with the plug body, and a second section having a hub portion contiguous with the first section and a plurality of generally evenly spaced arms extending outward from the hub portion. Each arm has a clockwise radial edge, a counter-clockwise radial edge and an underside surface facing the sealing surface of the plug body. A major portion of the underside surface of each arm is generally flat and generally parallel to the sealing surface. A respective rearwardly projecting nub is located on the respective underside surface of each respective arm of the plurality of arms, proximate the clockwise radial edge of each respective arm. Each nub has a ramp on a clockwise side thereof terminating rearwardly in an apex, and a wall on a counter-clockwise side thereof extending generally in the radial and axial directions from the apex to the major portion of the underside surface.

The plug may further include a generally circular elastomeric seal affixed on the sealing surface of the plug body generally concentric with the longitudinal axis. Each arm may have a radial span S from the longitudinal axis to a radial end of each arm, with the elastomeric seal having an inner radius N that is greater than the radial span S of each arm.

At least a portion of the plug body may have an outer circumferential surface adapted for engagement by a wrench and/or a socket, for rotation of the plug about its longitudinal axis. The plug may further include a nipple extending from the rearward end of the plug body, and a through-hole extending through at least the nipple and the plug body, and alternatively through the nipple, the plug body and the protuberance.

Each arm may have a radial end having an arcuate profile as viewed in the axial direction. The nub on each arm may be located proximate a radially distal end of the clockwise radial edge of the arm.

The plug may be rotatable in the clockwise direction for sealable insertion into a socket formed in a thin-walled part. The socket may include the thin-walled part, defining an aperture therethrough bounded by a rim of the thin-walled part about the aperture. The aperture may have a generally circular or generally regular polygonal perimeter. The socket also includes a plurality of generally evenly spaced tabs of the thin-walled part extending radially inward from the perimeter, wherein the number of tabs is a positive integer multiple of the number of arms. Each tab may have a length L as measured radially from the perimeter to a radial end of the respective tab, each arm may have a radial span S as measured radially from the longitudinal axis to a radial end of the respective arm, and the perimeter may define an inscribed circle inscribed therein having a radius R, wherein R−L<S<R.

According to one embodiment, a mechanical plug has a longitudinal axis defining forward and rearward axial directions, inward and outward radial directions, and clockwise and counter-clockwise circumferential directions as viewed in the forward direction. The plug includes a plug body having opposed forward and rearward ends. The forward end has a generally flat sealing surface facing in the forward direction, and a generally circular elastomeric seal affixed on the sealing surface generally concentric with the longitudinal axis. At least a portion of the plug body has an outer circumferential surface adapted for engagement by a wrench and/or a socket for rotation of the plug about the longitudinal axis. A protuberance extends from the forward end of the plug body generally concentric with the longitudinal axis. The protuberance has a first section contiguous with the plug body, and a second section having a hub portion contiguous with the first section and a plurality of generally evenly spaced arms extending outward from the hub portion. Each arm has a clockwise radial edge, a counter-clockwise radial edge and an underside surface facing the sealing surface of the plug body. A major portion of the underside surface of each arm is generally flat and generally parallel to the sealing surface. A respective rearwardly projecting nub is located on the respective underside surface of each respective arm of the plurality of arms proximate the clockwise radial edge of each respective arm. Each nub has a ramp on a clockwise side thereof terminating rearwardly in an apex, and a wall on a counter-clockwise side thereof extending generally in the radial and axial directions from the apex to the major portion of the underside surface. Each arm may have a radial span S from the longitudinal axis to a radial end of each arm, with the elastomeric seal having an inner radius N that is greater than the radial span S of each arm.

The mechanical plug may also include a nipple extending from the rearward end of the plug body, and a through-hole extending through at least the nipple and the plug body. Alternatively, the through-hole may extend through the nipple, the plug body and the protuberance.

Each arm may have a radial end having an arcuate profile as viewed in the axial direction. The nub on each arm may be located proximate a radially distal end of the clockwise radial edge of the arm.

According to one embodiment, a fastening system includes a plug and a compatible socket. The plug has a longitudinal axis defining forward and rearward axial directions, inward and outward radial directions, and clockwise and counter-clockwise circumferential directions as viewed in the forward direction. The plug includes a plug body having opposed forward and rearward ends, wherein the forward end has a generally flat sealing surface facing in the forward direction. A protuberance extends from the forward end of the plug body generally concentric with the longitudinal axis. The protuberance has a first section contiguous with the plug body, and a second section having a hub portion contiguous with the first section and a plurality of generally evenly spaced arms extending outward from the hub portion. Each arm has a clockwise radial edge, a counter-clockwise radial edge and an underside surface facing the sealing surface of the plug body. A major portion of the underside surface of each arm is generally flat and generally parallel to the sealing surface. A respective rearwardly projecting nub is located on the respective underside surface of each respective arm of the plurality of arms proximate the clockwise radial edge of each respective arm. Each nub has a ramp on a clockwise side thereof terminating rearwardly in an apex, and a wall on a counter-clockwise side thereof extending generally in the radial and axial directions from the apex to the major portion of the underside surface. The socket may be formed in a thin-walled part, and may include an aperture through the thin-walled part bounded by a rim of the thin-walled part thereabout. The aperture has a generally circular or generally regular polygonal perimeter, and a plurality of generally evenly spaced tabs of the thin-walled part extending radially inward from the perimeter. The number of tabs may be a positive integer multiple of the number of arms. The plug may be rotated in the clockwise direction about the longitudinal axis for sealable insertion into the socket. The plug may further include a generally circular elastomeric seal affixed on the sealing surface of the plug body generally concentric with the longitudinal axis, wherein each arm has a radial span S from the longitudinal axis to a radial end of each arm, and the elastomeric seal has an inner radius N that is greater than the radial span S of each arm. The nub on each arm may be located proximate a radially distal end of the clockwise radial edge of the arm. Each tab may have a length L as measured radially from the perimeter to a radial end of the respective tab, each arm may have a radial span S as measured radially from the longitudinal axis to a radial end of the respective arm, and the perimeter may define an inscribed circle inscribed therein having a radius R, wherein R-L<S<R.

BRIEF DESCRIPTION OF THE DRAWINGS

FIGS. 5-1 and 5-2 are top and bottom axial views, respectively, of a plug according to an embodiment of the disclosure.

FIGS. 6-1 and 6-2 are plan views of a socket compatible with a plug according to an embodiment of the disclosure, showing without the plug and with the plug, respectively.

FIGS. 7-1 and 7-2 are partial cross-sectional side views of a plug and socket according to an embodiment of the disclosure upon insertion of the plug but before rotation thereof, as seen from views 7-1-7-1 and 7-2-7-2 of FIG. 6-2, respectively.

FIGS. 8-1 and 8-2 are partial cross-sectional side views of a plug and socket according to an embodiment of the disclosure after insertion and rotation of the plug, as viewed from views 7-1-7-1 and 7-2-7-2 of FIG. 6-2, respectively.

FIGS. 12-1 and 12-2 are plan views of a socket compatible with a plug according to further embodiments of the disclosure.

FIGS. 14-1, 14-3 and 14-5 are bottom views of the plug protuberance and tabs before, during and after engagement therebetween according to an embodiment of the disclosure; and FIGS. 14-2, 14-4 and 14-6 are side views of the plug protuberance and one tab according to an embodiment of the disclosure, corresponding to FIGS. 14-1, 14-3 and 14-5, respectively.

Note that some of the drawings herein are subdivided into multiple related views, with all the related views sharing a common "root" figure number and each individual view having its own unique "dash" figure number. For example, FIGS. 5-1 and 5-2 are top and bottom axial views, respectively, of a plug according to an embodiment of the disclosure; both related views share the same "root" number (i.e., 5), and each individual view has its own unique "dash" number (i.e., −1 and −2). When drawings are subdivided in this way, reference may be made herein to the "root" figure number alone to refer collectively to all the associated "dash" numbers; thus, "FIG. 5" refers to FIGS. 5-1 and 5-2 collectively. Likewise, "FIG. 14" refers to FIGS. 14-1 through 14-6 collectively.

DETAILED DESCRIPTION

Figure 1:
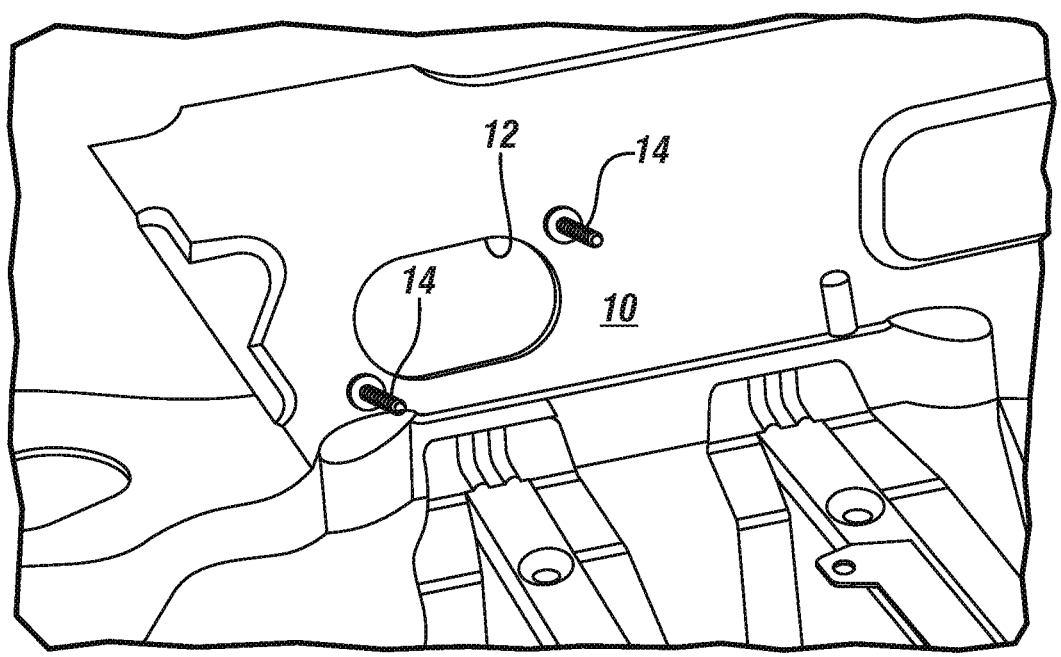
FIG. 1 is a perspective view of a monitoring/sampling hole according to an embodiment of the disclosure.

Referring now to the drawings, wherein like numerals indicate like parts in the several views, a plug (such as a mechanical self-retaining plug) and a compatible socket are shown and described herein in multiple embodiments.

Figure 2:
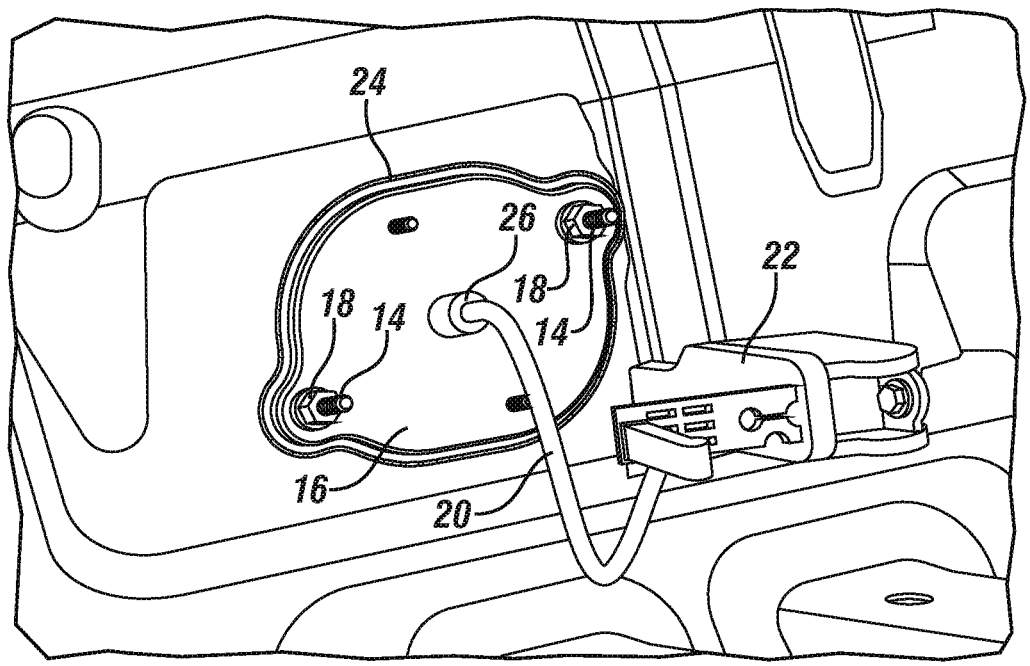
FIG. 2 is a perspective view of a monitoring/sampling hole covered by a monitoring/sampling plate according to an embodiment of the disclosure.

FIGS. 1 and 2 show close-up views of a structural assembly such as an automotive cockpit or passenger compartment, which may include a thin-walled part or portion 10 made of sheet metal or the like which may separate the interior of the passenger compartment from the exterior. The assembly has a hole 12 formed through the thin-walled part 10, which may be used for ventilation, drainage, tool access, inspection or other purposes. In some cases, such holes 12 may need to be covered up for some time, and then uncovered at other times. One approach for doing this is to provide bolts or threaded studs 14 adjacent the hole 12, either welded there or fed through from the other side of the thin-walled part 10. A plate or cover 16 having small holes corresponding to the bolts or studs 14 may then be placed over the hole 12 such that the bolts or studs 14 protrude through the small holes, and nuts 18 may be spun onto the bolts or studs 14 thereby removably fastening the plate 16 against the hole 12. An elastomeric gasket 24 may be disposed between the plate 16 and the surface of the thin-walled part 10 to aid in making the seal therebetween airtight. The plate 16 may optionally have a port 26 therethrough, with one end of a hose 20 sealably connected to the port 26 and the other end of the hose 20 sealably connected to a device 22 used for sampling or monitoring the atmosphere or other conditions on the other side of the plate 16.

While the approach illustrated by FIGS. 1 and 2 is adequate, it involves the use of multiple pieces of hardware. Plus, it involves either welding or affixing two or more threaded studs 14 onto the side of the thin-walled part 10 where the plate 16 is to be placed, or drilling two or more small holes through the thin-walled part 10 and passing bolts 14 through the small holes from the other side of the thin-walled part 10 and fixing the bolts 14 in place (such as by using low-profile stop nuts).

An alternative to this approach is presented in the present disclosure, using a plug 30 and a compatible socket 100 formed in a thin-walled part 110 as described in detail herein.

FIGS. 3-14 show various views of a plug 30 according to at least one embodiment of the present disclosure. The plug 30 has a longitudinal axis 31 defining a forward axial direction 33, a rearward axial direction 35, an outward radial direction 37 extending radially outward from the longitudinal axis 31, and a clockwise circumferential direction 39 as viewed in the forward axial direction 33. The plug 30 includes a plug body 40 having opposed forward and rearward ends 42, 44 wherein the forward end 42 has a generally flat sealing surface 46 facing in the forward direction 33, and a protuberance 50 extending from the forward end 42 or sealing surface 46 of the plug body 40 generally concentric or coaxial with the longitudinal axis 31.

Figures 1, 5:
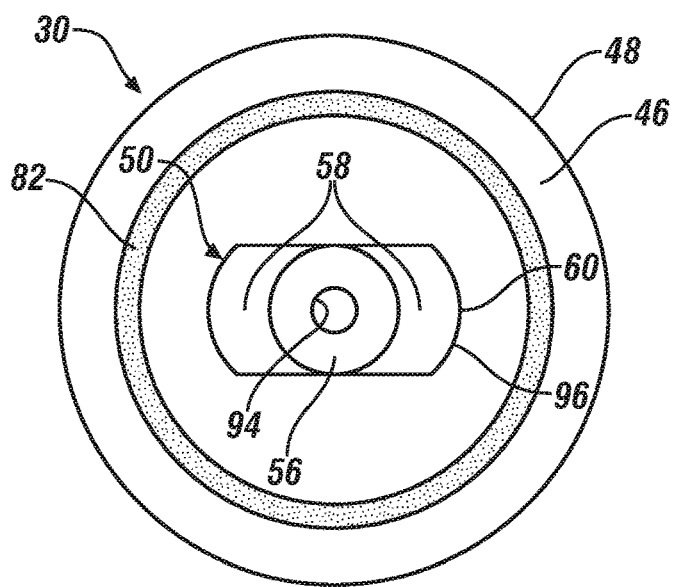
Figures 2, 5:
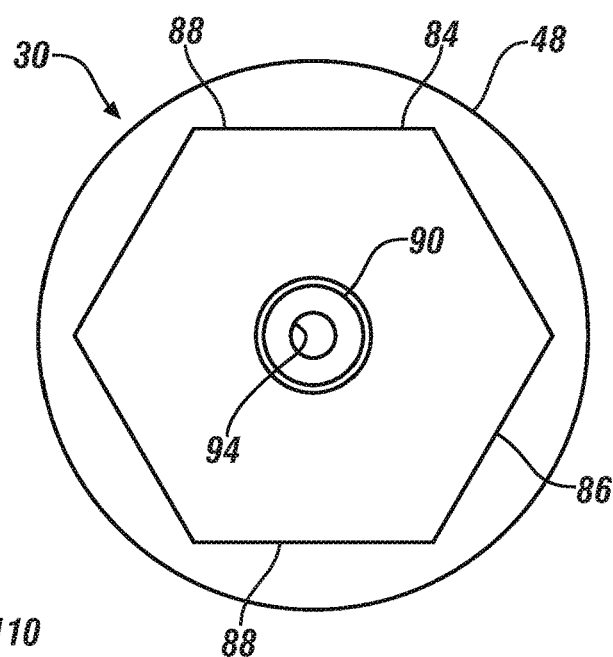
Figures 1, 6:
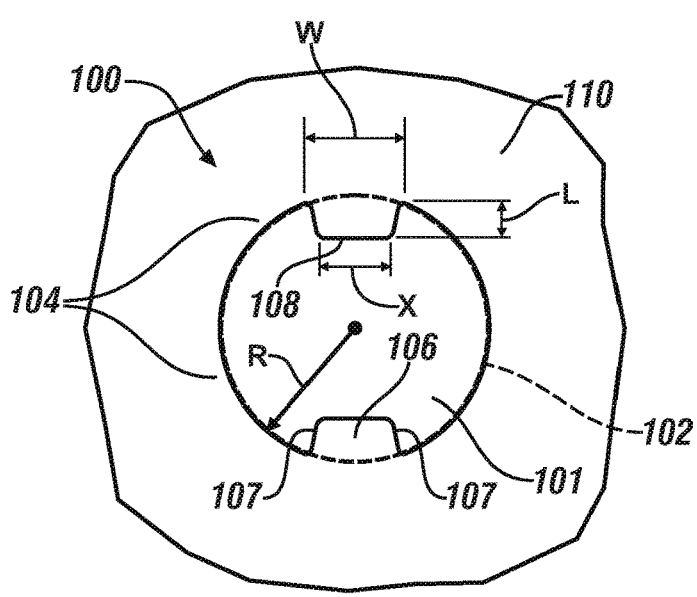
Figures 2, 6:
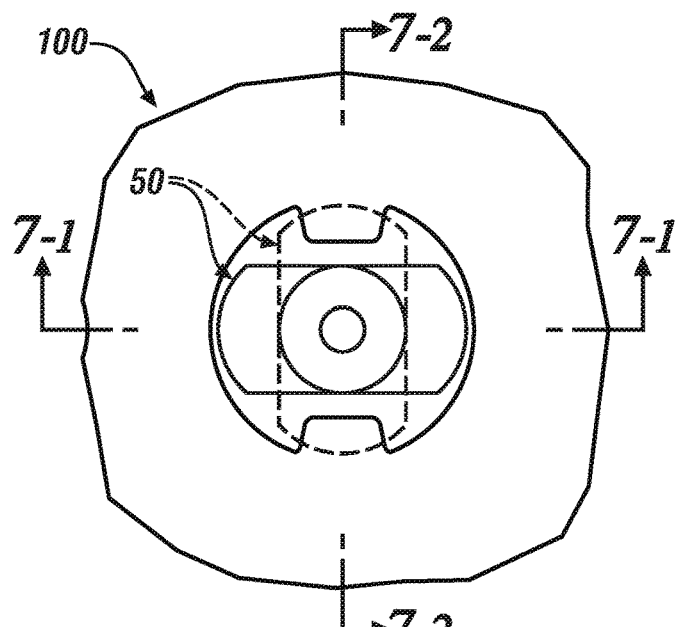

Although not shown in the drawings, the longitudinal axis 31 also defines an inward radial direction extending radially inward toward the longitudinal axis 31, and a counter-clockwise circumferential direction opposite the clockwise circumferential direction. The axial, radial and circumferential directions shown in FIG. 3 shall be used in this disclosure to define certain words describing relative locations, orientations and relationships among various elements. Using the elements in FIG. 3 as an example, gasket 82 appears to be "on top of" and "above" surface 46, and surface 46 appears to be "below" or "under" gasket 82. Thus, a "top view" of the plug 30 as shown in FIG. 5 can be seen as a view of the plug in FIG. 3 looking "down" in the rearward axial direction 35 from "above" the plug 30, and a "bottom view" of the plug 30 as shown in FIG. 6 can be seen as a view of the plug in FIG. 3 looking "upward" in the forward axial direction 33 from "below" or "underneath" the plug 30.

As shown in FIGS. 3-14, the protuberance 50 has a first section 52 contiguous with the plug body 40, and a second section 54 having a hub portion 56 contiguous with the first section 52 and a plurality of generally evenly spaced arms 58 extending outward from the hub portion 56. Note that while two arms 58 are shown in the drawings, the protuberance 50 may include three or more arms 58. Each arm 58 has a clockwise radial edge 62, a counter-clockwise radial edge 64 and an underside surface 66 facing the sealing surface 46 of the plug body 40. A major portion 68 of the underside surface 66 of each arm 58 is generally flat and generally parallel to the sealing surface 46. A rearwardly projecting nub 70 is located on the underside surface 66 of each arm 58, proximate the clockwise radial edge 62 of each arm 58. While the generally flat major portion 68 and the surface of the nub 70 are both part of the overall underside surface 66, it may be useful to visualize the generally flat major portion 68 as extending in a generally flat plane across the entire underside surface 66 from the counter-clockwise radial edge 64 to the clockwise radial edge 62, and the nub 70 as extending rearwardly from this underside surface 66, as may be visualized in FIG. 10. (That is, the nub 70 may be thought of as extending from a base 77 on or proximate the underside surface 66 to the apex 76 distal from the underside surface 66.) Each nub 70 has a ramp 72 formed on a clockwise side 74 of the nub 70 terminating rearwardly in an apex 76, and a wall 78 on a counter-clockwise side 80 of the nub 70, with the wall 78 extending generally in the radial and axial directions from the apex 76 to the generally flat major portion 68 of the underside surface 66.

The plug 30 may further include a generally circular elastomeric seal or gasket 82 affixed on the sealing surface 46 of the plug body 40 generally concentric with the longitudinal axis 31. Alternatively, the lip 48 or upper/forward end 42 of the plug body 40 may be made of an elastomeric sealing material. Each arm 58 may have a radial span S measured from the longitudinal axis 31 to a radial end 60 of each arm 58, with the elastomeric seal 82 having an inner radius N that is greater than the radial span S of each arm 58.

Figure 4:
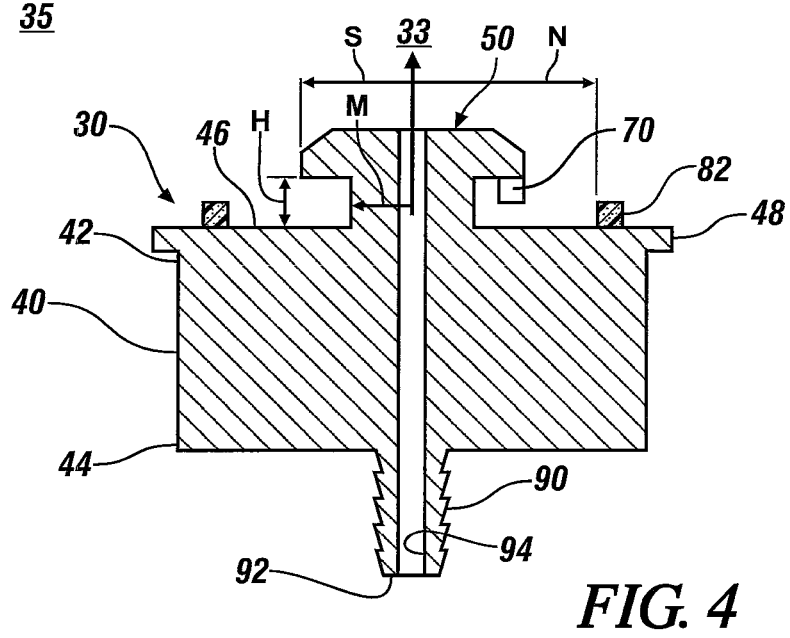
FIG. 4 is a cross-sectional side view of a plug according to an embodiment of the disclosure.
Figure 13:
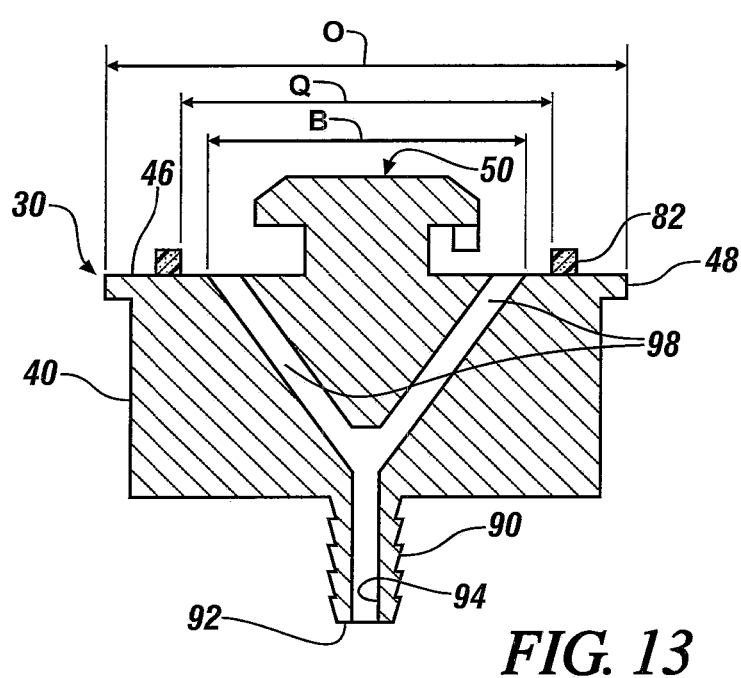
FIG. 13 is a cross-sectional side view of a plug according to an embodiment of the disclosure.

At least a portion 84 of the plug body 40 may have an outer circumferential surface 86 adapted for engagement by a wrench and/or a socket, for rotation of the entire plug 40 about its longitudinal axis 31. As shown in FIG. 5-2, the outer circumferential surface 86 may be hexagon-shaped so as to accommodate a wrench or socket, but the outer surface 86 may have a suitable shape having at least one pair of opposed parallel edges 88 about the perimeter of the outer surface 86, such as a square or rectangular shape. The plug 40 may further include a nipple 90 extending from the rearward end 44 of the plug body 40, and a through-hole 94 extending through at least the nipple 90 and the plug body 40 as shown in FIG. 13, and alternatively through the nipple 90, the plug body 40 and the protuberance 50 (e.g., from a tip 92 of the nipple 90 to a top/forwardmost end of the protuberance 50) as shown in FIG. 4. Referring to FIG. 13, the through-hole 94 may include one or more branches 98, each of which terminates in an opening on the sealing surface 46 of the plug body 40.

Each arm 58 may have a radial end 60 having an arcuate profile 96 as viewed in the axial direction 33, 35. The nub 70 on each arm 58 may be located proximate a radially distal end of the clockwise radial edge 62 of the arm 58.

Figure 11:
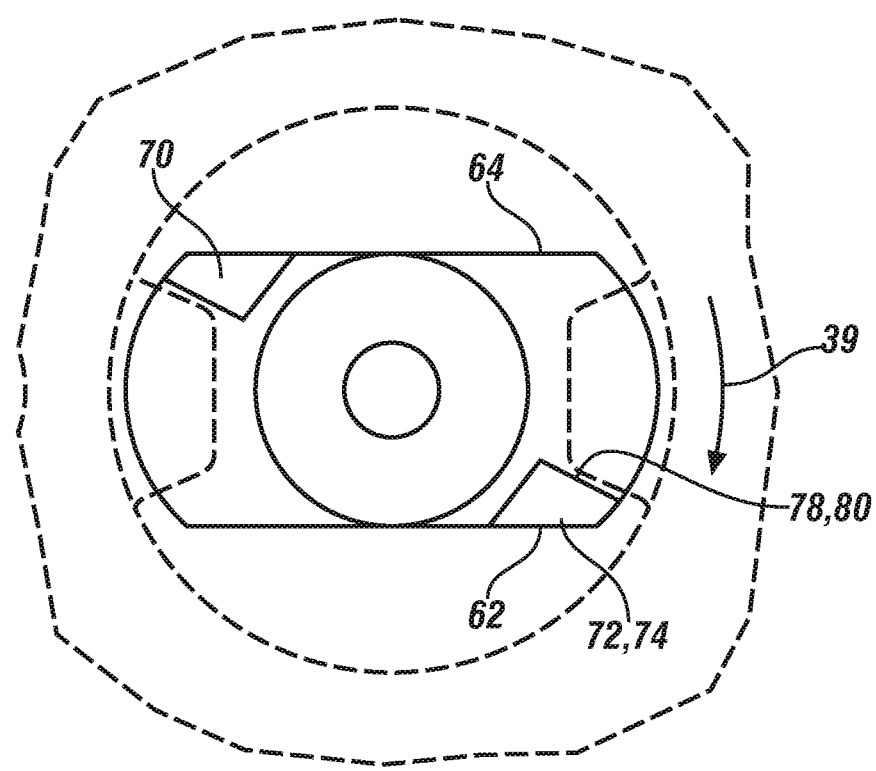
FIG. 11 is a bottom view of the plug protuberance according to an embodiment of the disclosure, as seen from view 11-11 of FIG. 9.
Figures 1, 12:
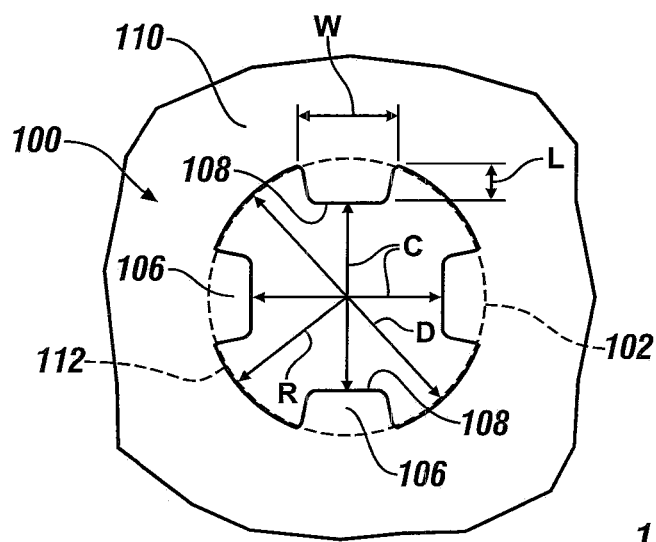
Figures 2, 12:
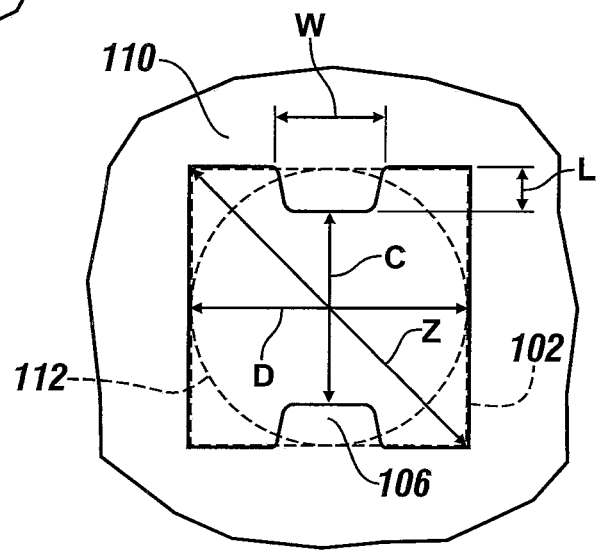

The plug 30 may be inserted into a compatible socket or window 100 formed in a thin-walled part 110 and rotated in the clockwise direction 39 for sealable insertion into the socket 100, as will be explained more fully below. (Note that "thin-walled" means that the thickness of the thin-walled part 110 in the area immediately about the socket 100 is thin compared to the planar dimensions of the thin-walled part 110. For example, a part made of sheet metal may be considered a thin-walled part 110.) Because the plug 30 and socket 100 may fit compliantly together, they may be thought of as sharing the same cylindrical coordinate system as defined by the longitudinal axis 31 which extends along the length of plug 30 and through the center of the socket 100 generally orthogonally to the plane of the socket 100 when the plug 30 is engaged in the socket 100. Thus, the same axial, radial and circumferential directions for the plug 30 are likewise applied herein to the socket 100. Referring now to FIGS. 6, 11 and 12, the socket 100 may include an aperture or hole 101 through the thin-walled part 110, bounded by a rim or lip 104 of thin-walled part material about the aperture 101. The aperture 101 may have a generally circular perimeter 102 such as shown in FIG. 12-1, or a generally regular polygonal perimeter such as the square shape shown in FIG. 12-2. Other suitable regular polygon shapes include triangles, pentagons, hexagons, and so forth. The socket 100 also includes a plurality of generally evenly spaced tabs 106 of the thin-walled part 110 extending radially inward from the perimeter 102. (The perimeter 102 associated with the shape of each aperture 101 may be generally visualized by imagining what the shape of the aperture 101 would look like if there were no tabs 106 extending radially inward.) In a given plug 30 and socket 100 combination, the number of tabs 106 in the socket 100 may be a positive integer multiple of the number of arms 58 on the plug 30. For example, if the plug 30 has two arms 58, the socket 100 may have two tabs, four tabs, six tabs, etc.

FIGS. 4-6 and 9-13 show some of the geometric aspects of the plug 30 and socket 100. As shown in FIG. 4, each arm 58 has a span S as measured from the longitudinal axis 31, 33 to the radial end 60 of the arm 58. The first section 52 of the protuberance 50 has an axial height or length H as measured from the top of the sealing surface 46 to the underside surface 66 of the arms 58; thus, the hub portion 56 and the arms 58 (with the exception of the nubs 70) are spaced apart from the sealing surface 46 by this distance H. The first section 52 also has a maximum radius M as measured from the longitudinal axis 31, 33 to the outermost radial extent of the first section 52. The first section 52 may take the form of a cylinder or other suitable shape, and may be concentric or coaxial with the longitudinal axis 31, 33. For example, if the first section 52 has an elliptical axial cross-section rather than a circular axial cross-section, then the maximum radius M of the first section 52 would be the radius as measured along the major axis of the elliptical cross-section.

FIG. 13 shows some additional geometric aspects of the plug 30. Note that while some aspects of the plug 30 shown in this drawing relate to an embodiment where the through-hole 94 extends through one or more branches 98 terminating on the sealing surface 46, some of the other aspects also relate to other embodiments, such as that shown in FIG. 4 where the through-hole 94 extends through the protuberance 50. Note that the radial span S of each arm 58 is less than the inner radius N of the elastomeric gasket or seal 82. Also note that the radially outermost edges of where the branches 98 meet the sealing surface 46 defines an outer periphery whose diameter or span B is less than the inner diameter Q of the elastomeric gasket or seal 82. Further, note that the forward end 42 of the plug body 40 may include a lip or rim 48 whose outer diameter or span O may be larger than the outer diameter or span of the plug body 40. However, if no lip or rim 48 is provided, then the outer diameter or span O would be the outer diameter or span of the plug body 40.

Figure 10:
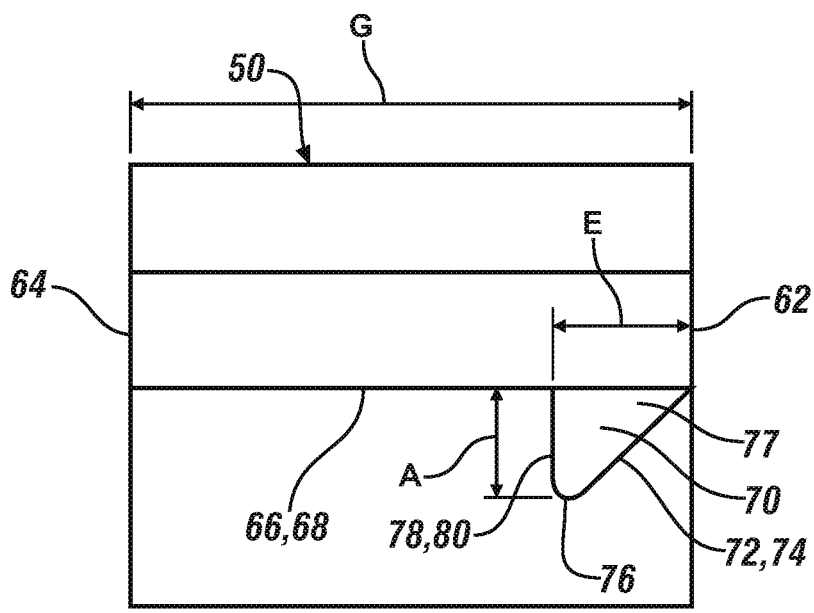
FIG. 10 is a side view of the plug protuberance according to an embodiment of the disclosure, as seen from view 10-10 of FIG. 9.

FIG. 10 shows some further geometric aspects of the plug 30, and of the protuberance 50 in particular. The protuberance 50 has an overall width or girth G, shown here extending from the counter-clockwise radial edge 64 to the clockwise radial edge 62. As mentioned above, each arm 58 extends out beyond the maximum radius M of the first section 52 so that an underside surface 66 is provided which faces rearwardly toward the sealing surface 46. This underside surface 66 includes a nub 70 whose base 77 has a circumferential width E and whose apex 76 extends rearwardly a distance A below the generally flat major portion 68 of the underside surface 66. The nub 70 is disposed adjacent or along the clockwise radial edge 62. Note that the width E of the nub 70 may be much less than the girth G of the protuberance, and that the circumferential width of the flat major portion 68 (i.e., G minus E) may be much greater than the width E of the nub 70.

FIGS. 6, 11 and 12 show some of the geometric aspects of the socket 100, aperture 101 and tabs 106. Each tab 106 has an outer or perimetral width W as measured along the perimeter 102 of the aperture or hole 101, and a radial length L as measured radially from the perimeter 102 to the radial end 108 of each tab 106. Tabs 106 may also have a thickness T as measured in the axial direction, which may be the same as the thickness of the thin-walled part 110 in which the aperture 101 and socket 100 are formed. For tabs 106 shaped as shown in the drawings, each tab 106 may have an inner width X as measured across the radial end 108 of the tab 106. Although not shown in the drawings, the tabs 106 may assume a variety of shapes and sizes. For example, a tab 106 might not have a straight edge segment across the radial end 108 of the tab 106, nor a straight edge segment along each radial edge 107, but instead the end 108 may be rounded, parabolic or bullet-shaped.

For sockets 100 whose aperture 101 is generally circular in shape like in FIGS. 6, 11 and 12-1, the perimeter 102 of the socket 100 and hole 101 is considered to be a circle of radius R and diameter D, where the radius R extends from the center of the hole 101 to a point on the edge or rim 104 where there is no tab 106, and where the diameter D is twice the length of radius R. For other sockets 100 whose aperture 101 is not generally circular in shape—for example, generally square as in FIG. 12-2, or triangular, pentagonal, hexagonal, etc.—the perimeter 102 of the socket 100 and hole 101 is considered to define an inscribed circle 112 inscribed therein (also referred to later as a "turning circle") having a radius R and diameter D. (For a generally circular perimeter 102, the turning circle or inscribed circle 112 would be the same as the perimeter 102, both having a radius of length R.) Each non-circular perimeter 102 also has a diagonal of length Z which passes through the center of the inscribed circle 112 and spans across the entire aperture 101, with at least one end of the diagonal Z at a vertex of the perimeter 102. Thus, for generally square sockets 100 and apertures 101 such as shown in FIG. 12-2, the diagonal Z spans from one vertex or corner of the square, through the center of the inscribed circle 112, and extends to the opposing vertex or corner of the square. Likewise, for other sockets 100 and holes 101 whose regular polygonal perimeters 102 have an even number of sides (e.g., hexagons and octagons), each diagonal Z will span from one vertex to an opposing vertex. However, for other sockets 100 and holes 101 whose regular polygonal perimeters 102 have an odd number of sides (e.g., triangles and pentagons), each diagonal Z will span from one vertex to an opposing side (not to an opposing vertex). Therefore, in order for the plug 30 to sealably cover the aperture 101 of a socket 100, the outer diameter O of the sealing surface 46 (if no elastomeric seal 82 is used) or twice the inner radius N (if an elastomeric seal 82 is used) would be larger than (i) diameter D for generally circular perimeters 102, (ii) diagonal length Z for non-circular perimeters 102 having an even number of sides (e.g., squares, hexagons and octagons), or (iii) the length 2(Z−R) for non-circular perimeters 102 having an odd number of sides (e.g., triangles and pentagons).

For sockets 100 having one or more opposed pairs of tabs 106 (such as in FIGS. 6, 11-12 and 14), the distance between the radial ends 108 of each opposed pair of tabs 106 (also referred to herein as a "clearance distance" between opposing tabs 106) may be C, which is equivalent to D−2L or 2(R−L). Therefore, the distance from the center of the perimeter 102 to the radial end 108 of each tab 106 would be half of the clearance distance C, or R−L. However, for sockets 100 which do not have one or more opposed pairs of tabs 106, such as when the shape of the aperture 101 is triangular, circular or hexagonal and three generally evenly spaced tabs 106 are used, a clearance distance C is not defined; but, the distance from the center of the perimeter 102 to the radial end 108 of each tab 106 would be R−L. Thus, for both perimeters 102 having opposed tabs 106 and perimeters 102 not having opposed tabs 106, the distance from the center of the perimeter 102 to the radial end 108 of each tab 106 would be R−L. Therefore, for a given type of perimeter 102, the radial span S of each protuberance arm 58 may be large enough so as to extend radially beyond the tab ends 108, yet less than the radius R of the socket's perimeter 102, which may be stated as: R−L<S<R.

Figure 3:
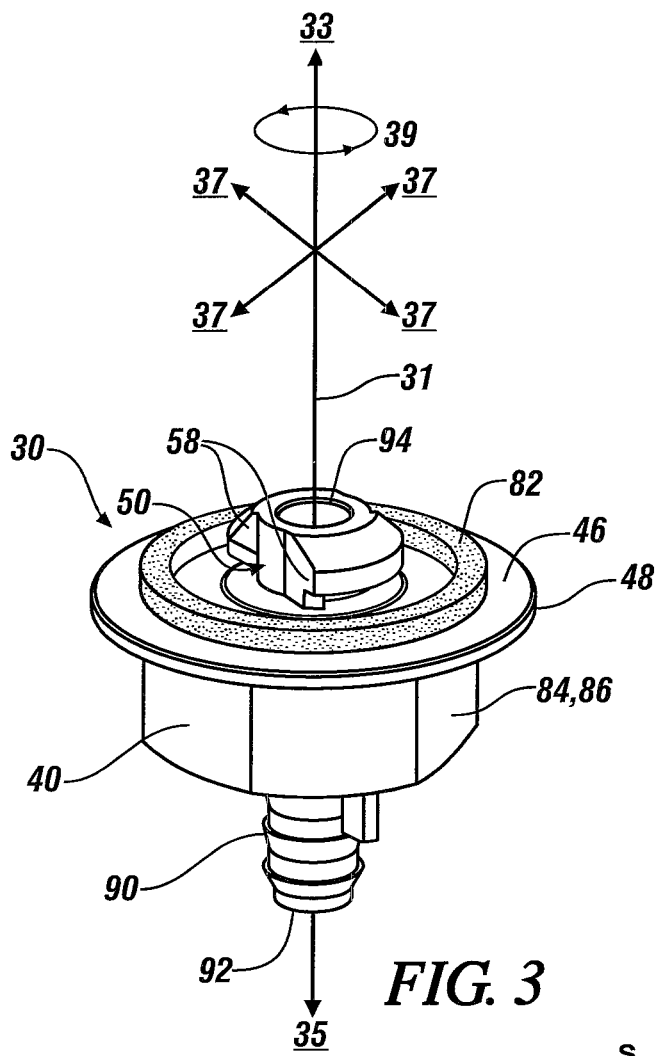
FIG. 3 is a perspective view of a plug according to an embodiment of the disclosure.
Figures 1, 7:
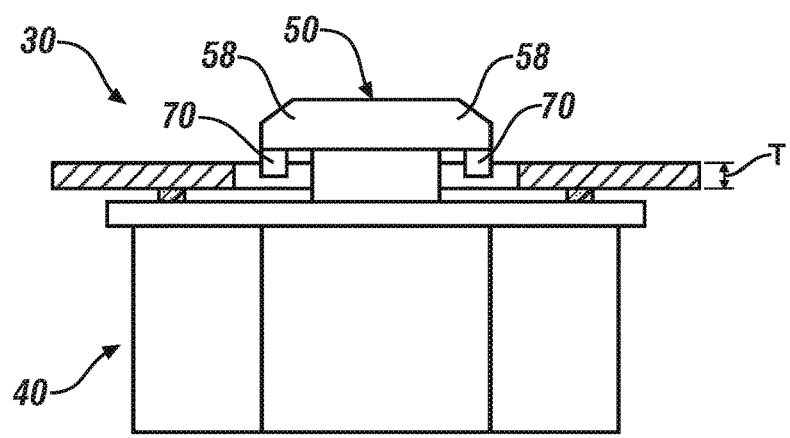
Figures 2, 7:
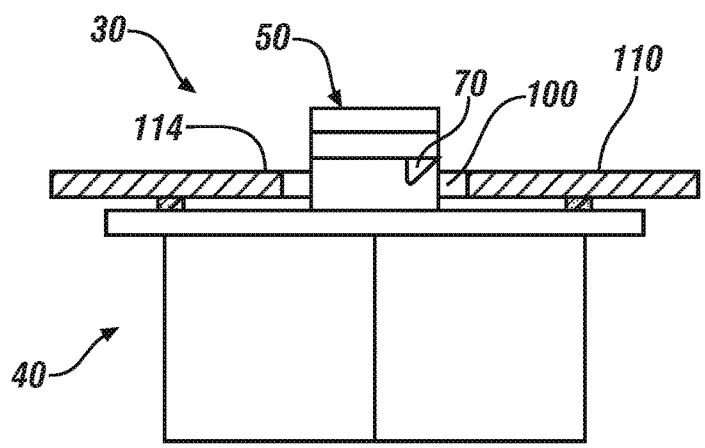
Figures 1, 8:
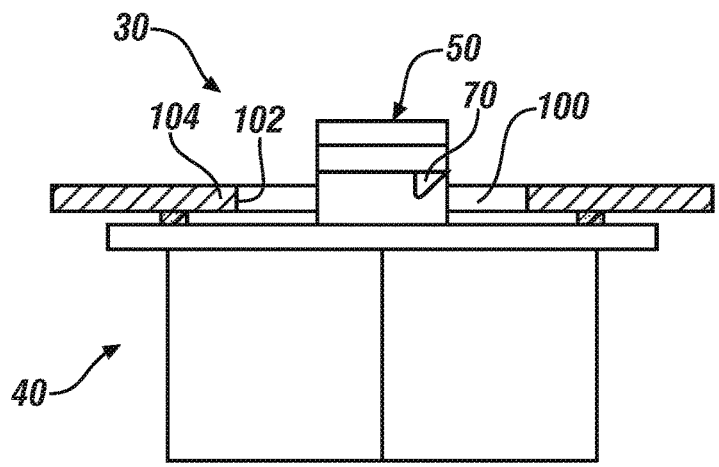
Figures 2, 8:
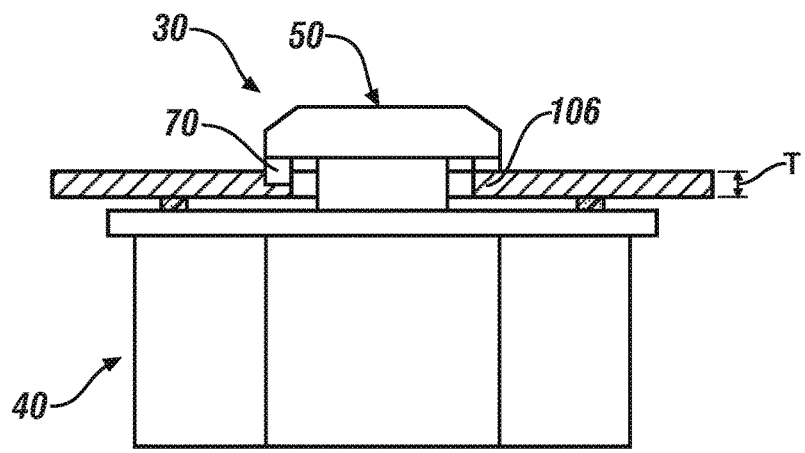
Figure 9:
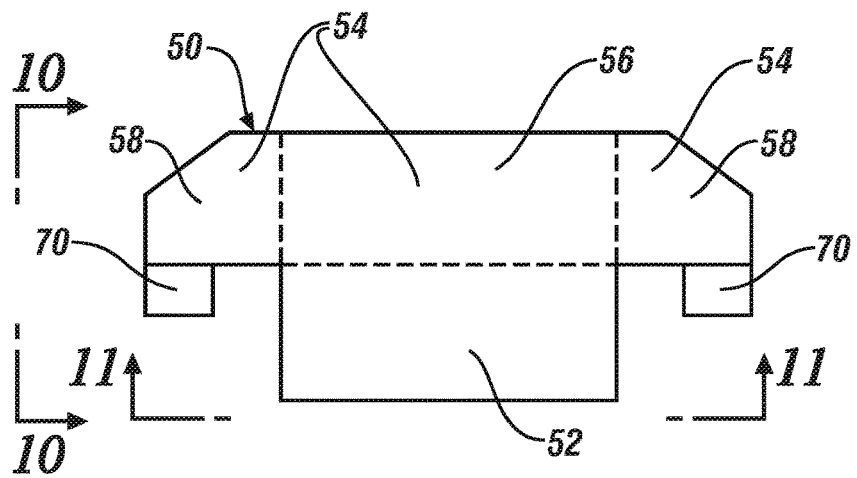
FIG. 9 is a side view of the plug protuberance according to an embodiment of the disclosure.
Figures 1, 14:
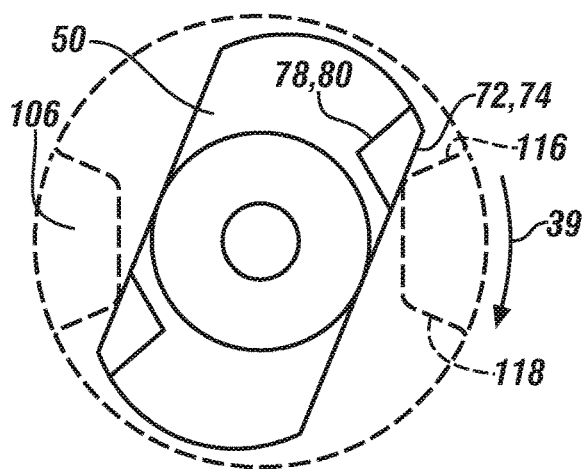
Figures 2, 14:
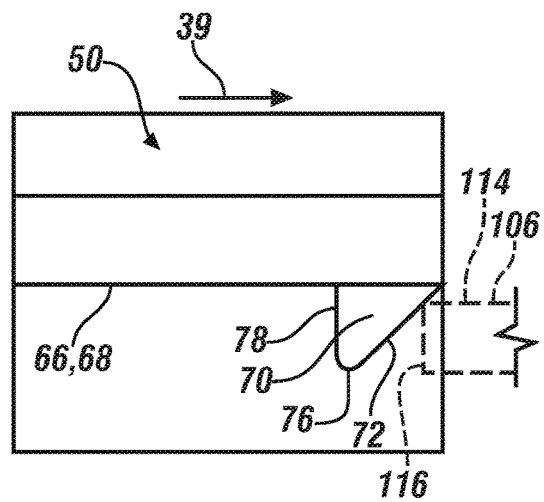
Figures 3, 14:
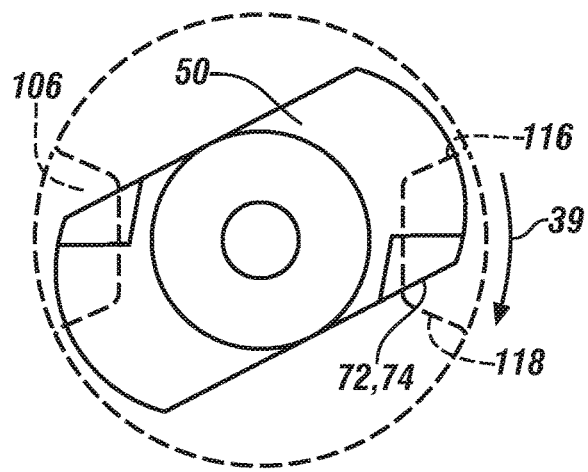
Figures 4, 14:
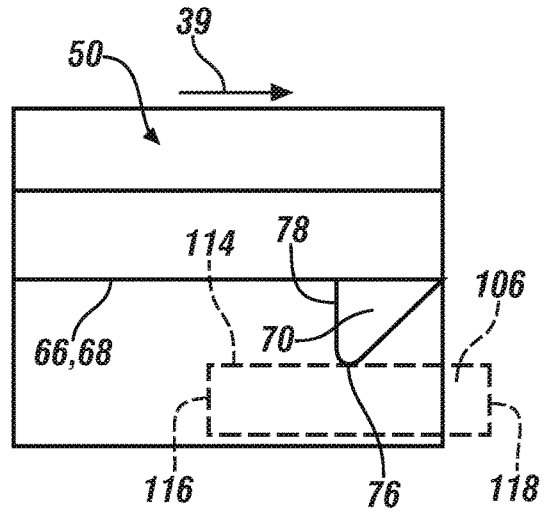
Figures 5, 14:
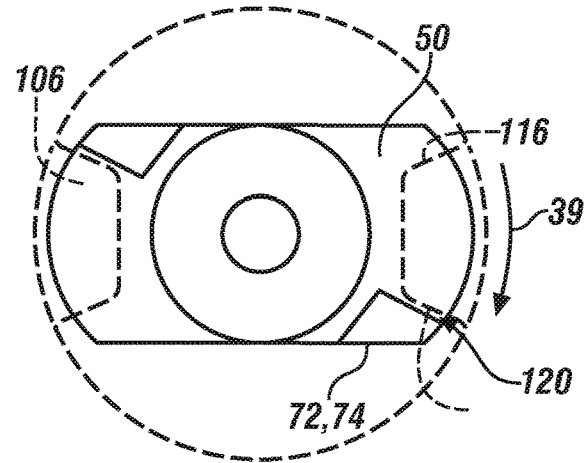
Figures 6, 14:
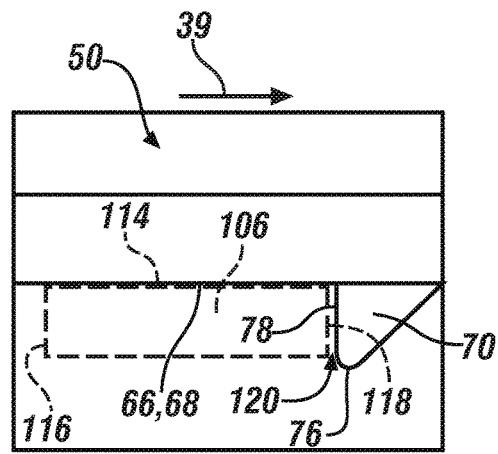

FIGS. 6-2, 7, 8, 11 and 14 illustrate how the plug 30 may be inserted and sealably engaged with the socket 100. In FIG. 6-2, the protuberance 50 is shown in solid lines indicating the orientation of the plug 30 when it is initially inserted into the socket 100, and in dashed lines indicating the orientation of the plug 30 after it has been rotated clockwise within the socket 100 by approximately 90 degrees and sealably engaged with the socket 100. In FIGS. 6-2 (solid lines), 7-1 and 7-2, the plug 30 has been inserted into the socket 100 with the protuberance 50 extending through the plane of the socket 100 and thin-walled part 110. The plug 30 may be pressed in the forward axial direction 33 to urge the sealing surface 46 into contact with the underside of the thin-walled part 110, or if an elastomeric gasket or seal 82 is used, to compress the gasket 82 against the underside of the thin-walled part 110 (in which case the sealing surface 46 may or may not be in contact with the underside of the thin-walled part 110). In this orientation, a majority of the second section 54 of the protuberance 50, including hub portion 56 and arms 58, may extend through the socket 100 beyond the plane of the socket 100 and thin-walled part 110, with the possible exception that the nubs 70 might not extend beyond such plane, as shown in FIG. 7-1. Then the plug 30 may be rotated in the clockwise direction 39 until the ramp portion 72 of each nub 70 makes contact with the counter-clockwise radial edge 64 (i.e., leading edge 116) of a corresponding tab 106, as shown in FIGS. 14-1 and 14-2. As the plug 30 continues to be turned in the clockwise direction 39 as shown in FIGS. 14-3 and 14-4, the ramp portion 72 of the nub 70 causes the plug 30 to slightly "rise" or extend in the forward axial direction 33 even further beyond the plane of the socket 100 and thin-walled part 110, and also causes the elastomeric seal 82 and/or the sealing surface 46 to be even further compressed, until the top/forward surface 114 of each tab 106 is in contact with the apex 76 of the nub 70. As the plug 30 continues to be turned even further in the clockwise direction 39, the plug 30 and socket 100 reach the orientation shown in FIGS. 6-2 (dashed lines), 8-1, 8-2, 11, 14-3 and 14-4. Here, the plug 30 has been turned until each nub 70 travels toward and just beyond the clockwise radial edge 62 (i.e., trailing edge 118) of a corresponding tab 106, until the plug "drops" or recedes back in the rearward axial direction 35. When this occurs, the compression that was previously added by the engagement between the ramp portion 72 of the nubs 70 and their respective tabs 106 is suddenly released, as the top surface 114 of each tab 106 is disposed against the generally flat major portion 68 of a respective arm's underside surface 66. In this orientation, the trailing/clockwise edge 118 of each tab 106 is disposed proximate or against a wall portion 78 of a respective nub 70, with or without a gap 120 therebetween.

One of the advantages of this arrangement of the plug 30 and compliant socket 100 is that the ramped nub 70 facilitates a compression seal between the sealing surface 46 and/or elastomeric gasket 86 and the surface of the thin-walled part 110 by the clockwise rotation of the plug 30. Additionally, the wall feature 78 may provide a sudden and distinct "hard stop" which can be felt or detected when the desired orientation is reached. The wall 78 also serves to prevent the plug 30 from backing out, making it self-retaining. Furthermore, this arrangement may facilitate the torque-checking of such plugs 30 in automated manufacturing and assembly environment as discussed above. A plug 30 as described herein may be used either without a nipple 90 and through-hole 94 (such as to sealably close off a tabbed hole 101 or socket 100 formed in a thin-walled part 110), or with a nipple 90 and through-hole 94 (such as for monitoring and/or sampling the atmosphere on the axially forward side of the thin-walled part 110 from the axially rearward side of the thin-walled part 110).

As an alternative to forming a tabbed hole or aperture 101 in a thin-walled part 110 to create a socket 100, it is also possible to form a hole in the thin-walled part 110 that is larger than the desired tabbed hole 101, and insert a grommet therein which has the desired tabbed hole 101 or socket 100 shape.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to be illustrative, they are by no means limiting and are exemplary embodiments. Many other embodiments will be apparent to those of skill in the art upon reviewing the above description. Moreover, in the following claims, use of the terms "first", "second", "top", "bottom", etc. are used merely as labels, and are not intended to impose numerical or positional requirements on their objects. Further, the limitations of the following claims are not written in means-plus-function or step-plus-function format and are not intended to be interpreted as such, unless and until such claim limitations expressly use the phrase "means for" or "step for" followed by a statement of function void of further structure. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular" or "generally circular", these adverbs mean "for the most part", "to a significant extent" and/or "to a large degree", and do not necessarily mean "perfectly", "completely", "strictly" or "entirely". For example, a "substantially circular shape" can include one or more of the following: a perfect circle; an ellipse whose major and minor axes have lengths within about 10% of each other; an undulatory shape that has an overall circular or nearly circular elliptical shape; and a foregoing shape whose perimeter, in whole or in part, includes deviations inward and/or outward from the overall circular, nearly circular elliptical or undulatory shape. Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A plug having a longitudinal axis defining forward and rearward axial directions, inward and outward radial directions, and clockwise and counter-clockwise circumferential directions as viewed in the forward direction, comprising:
   a plug body having opposed forward and rearward ends wherein the forward end has a generally flat sealing surface facing in the forward direction;
   a protuberance extending from the forward end of the plug body generally concentric with the longitudinal axis, the protuberance having a first section contiguous with the plug body, and a second section having a hub portion contiguous with the first section and a plurality of generally evenly spaced arms extending outward from the hub portion, each arm having a clockwise radial edge, a counter-clockwise radial edge and an underside surface facing the sealing surface of the plug body, a major portion of the underside surface of each arm being generally flat and generally parallel to the sealing surface;
   a respective rearwardly projecting nub located on the respective underside surface of each respective arm of the plurality of arms proximate the clockwise radial edge of each respective arm, each nub having a ramp on a clockwise side thereof terminating rearwardly in an apex and a wall on a counter-clockwise side thereof extending generally in the radial and axial directions from the apex to the major portion of the underside surface;
   a nipple extending from the rearward end of the plug body; and
   a through-hole extending through the nipple and terminating in one or more openings on the sealing surface of the plug body.

2. A plug according to claim 1, further comprising a generally circular elastomeric seal affixed on the sealing surface of the plug body generally concentric with the longitudinal axis.

3. A plug according to claim 2, wherein each arm has a radial span S from the longitudinal axis to a radial end of each arm, and the elastomeric seal has an inner radius N that is greater than the radial span S of each arm.

4. A plug according to claim 3, wherein each respective opening is located within the inner radius of the elastomeric seal.

5. A plug according to claim 1, wherein at least a portion of the plug body has an outer circumferential surface adapted for engagement by at least one of a wrench and a socket for rotation of the plug about the longitudinal axis.

6. A plug according to claim 1, wherein each arm has a radial end having an arcuate profile as viewed in the axial direction.

7. A plug according to claim 1, wherein the nub on each arm is located proximate a radially distal end of the clockwise radial edge thereof.

8. A plug according to claim 1, wherein the plug is rotatable in the clockwise direction for sealable insertion into a socket formed in a thin-walled part, wherein the socket includes the thin-walled part defining an aperture therethrough bounded by a rim of the thin-walled part thereabout, the aperture having one of a generally circular perimeter and a generally regular polygonal perimeter, and a plurality of generally evenly spaced tabs of the thin-walled part extending radially inward from the perimeter, wherein the number of tabs is a positive integer multiple of the number of arms.

9. A plug according to claim 8, wherein each tab has a length L as measured radially from the perimeter to a radial end of the respective tab, each arm has a radial span S as measured radially from the longitudinal axis to a radial end of the respective arm, and the perimeter defines an inscribed circle inscribed therein having a radius R, wherein R−L<S<R.

10. A plug according to claim 1, wherein the through-hole transitions within the plug body into one or more branches, wherein each branch terminates in a respective opening on the sealing surface of the plug body and is non-concentric with the longitudinal axis.

11. A mechanical plug having a longitudinal axis defining forward and rearward axial directions, inward and outward radial directions, and clockwise and counter-clockwise circumferential directions as viewed in the forward direction, comprising:
a plug body having opposed forward and rearward ends, wherein the forward end has a generally flat sealing surface facing in the forward direction and a generally circular elastomeric seal affixed on the sealing surface generally concentric with the longitudinal axis, and wherein at least a portion of the plug body has an outer circumferential surface adapted for engagement by at least one of a wrench and a socket for rotation of the plug about the longitudinal axis;
a protuberance extending from the forward end of the plug body generally concentric with the longitudinal axis, the protuberance having a first section contiguous with the plug body, and a second section having a hub portion contiguous with the first section and a plurality of generally evenly spaced arms extending outward from the hub portion, each arm having a clockwise radial edge, a counter-clockwise radial edge and an underside surface facing the sealing surface of the plug body, a major portion of the underside surface of each arm being generally flat and generally parallel to the sealing surface;
a respective rearwardly projecting nub located on the respective underside surface of each respective arm of the plurality of arms proximate the clockwise radial edge of each respective arm, each nub having a ramp on a clockwise side thereof terminating rearwardly in an apex and a wall on a counter-clockwise side thereof extending generally in the radial and axial directions from the apex to the major portion of the underside surface;
a nipple extending from the rearward end of the plug body; and
a through-hole extending through the nipple and transitioning within the plug body into one or more branches, wherein each branch terminates in a respective opening on the sealing surface of the plug body and is non-concentric with the longitudinal axis.

12. A mechanical plug according to claim 11, wherein each arm has a radial span S from the longitudinal axis to a radial end of each arm, and the elastomeric seal has an inner radius N that is greater than the radial span S of each arm.

13. A mechanical plug according to claim 11, wherein the nub on each arm is located proximate a radially distal end of the clockwise radial edge thereof.

14. A mechanical plug according to claim 11, wherein each respective opening is located within the inner radius of the elastomeric seal.

15. A fastening system, comprising:
(a) a plug having a longitudinal axis defining forward and rearward axial directions, inward and outward radial directions, and clockwise and counter-clockwise circumferential directions as viewed in the forward direction, the plug comprising:
a plug body having opposed forward and rearward ends wherein the forward end has a generally flat sealing surface facing in the forward direction;
a protuberance extending from the forward end of the plug body generally concentric with the longitudinal axis, the protuberance having a first section contiguous with the plug body, and a second section having a hub portion contiguous with the first section and a plurality of generally evenly spaced arms extending outward from the hub portion, each arm having a clockwise radial edge, a counter-clockwise radial edge and an underside surface facing the sealing surface of the plug body, a major portion of the underside surface of each arm being generally flat and generally parallel to the sealing surface;
a respective rearwardly projecting nub located on the respective underside surface of each respective arm of the plurality of arms proximate the clockwise radial edge of each respective arm, each nub having a ramp on a clockwise side thereof terminating rearwardly in an apex and a wall on a counter-clockwise side thereof extending generally in the radial and axial directions from the apex to the major portion of the underside surface;
a nipple extending from the rearward end of the plug body; and
a through-hole extending through the nipple and terminating in one or more openings on the sealing surface of the plug body; and
(b) a socket formed in a thin-walled part, wherein the socket includes an aperture through the thin-walled part bounded by a rim of the thin-walled part thereabout, the aperture having one of a generally circular perimeter and a generally regular polygonal perimeter, and a plurality of generally evenly spaced tabs of the thin-walled part extending radially inward from the perimeter, wherein the number of tabs is a positive integer multiple of the number of arms.

16. A fastening system according to claim 15, wherein the plug is rotatable in the clockwise direction for sealable insertion into the socket.

17. A fastening system according to claim 15, further comprising a generally circular elastomeric seal affixed on the sealing surface of the plug body generally concentric with the longitudinal axis, wherein each arm has a radial span S from the longitudinal axis to a radial end of each arm, and the elastomeric seal has an inner radius N that is greater than the radial span S of each arm.

18. A fastening system according to claim 17, wherein each respective opening is located within the inner radius of the elastomeric seal.

19. A fastening system according to claim 15, wherein the nub on each arm is located proximate a radially distal end of the clockwise radial edge thereof.

20. A fastening system according to claim 15, wherein each tab has a length L as measured radially from the perimeter to a radial end of the respective tab, each arm has a radial span S as measured radially from the longitudinal axis to a radial end of the respective arm, and the perimeter defines an inscribed circle inscribed therein having a radius R, wherein R−L<S<R.

* * * * *